United States Patent

Sangster et al.

[11] Patent Number: 6,123,868
[45] Date of Patent: Sep. 26, 2000

[54] PHOTOCHROMIC MOLECULAR HEAT EXCHANGE MEDIUM

[76] Inventors: Bruce Sangster; James D. Bond, both of 3857 Birch St., Ste. 556, Newport Beach, Calif. 92660

[21] Appl. No.: 09/219,540

[22] Filed: Dec. 22, 1998

Related U.S. Application Data

[63] Continuation-in-part of application No. 08/674,183, Jul. 1, 1996, abandoned, and a division of application No. 08/437,430, May 5, 1995, Pat. No. 5,626,020.

[51] Int. Cl.[7] .................................................. C09K 5/00
[52] U.S. Cl. ................................ 252/73; 252/67; 252/70
[58] Field of Search ................................... 252/70, 67, 73

[56] References Cited

U.S. PATENT DOCUMENTS 3,413,225  11/1968  Dmuchovsky et al. ................. 508/184

FOREIGN PATENT DOCUMENTS 2-164809  6/1990  Japan .
3-81378   4/1991  Japan .
3-91578   4/1991  Japan .

OTHER PUBLICATIONS

Luchina et al, "Some Features of the Photochromic Behavior of Spiroanthrooxazine in Solutions", no month available 1992.

*Primary Examiner*—Christine Skane

[57] ABSTRACT

A heat exchange medium is disclosed which utilizes a change in molecular configuration of photochromic compounds when they are exposed to light. Further, by the addition of the photochromic compound as a side chain to an organic polymer, the polymer can also be induced to change configuration and absorb larger amounts of heat.

2 Claims, 1 Drawing Sheet

PHOTOCHROMIC MOLECULAR HEAT EXCHANGE MEDIUM

CROSS-REFERENCES TO RELATED APPLICATIONS

This application, Ser. No. 09/219,540 is a continuation in part of application Ser. No. 08/674,183, filed Jul. 1, 1996 now abandoned, and is a divisional application of Ser. No. 08/437,430, dated May 5, 1995 now a granted U.S. Pat. No. 5,626,020.

STATEMENT REGARDING FEDERALLY SPONSORED RESEARCH OR DEVELOPMENT

This application has not been funded or supported by any federal funds or organizational sponsorship.

MICROFICHE APPENDIX

Not applicable.

BACKGROUND OF THE INVENTION

This application, Ser. No. 09/219,540 is a continuation in part of application Ser. No. 08/674,183, now abandoned, and is a divisional application of Ser. No. 08/437,430, dated May 5, 1995 now a granted U.S. Pat. No. 5,626,020.

1. Field of the Invention

This present invention relates to heat exchange media and more particularly to chemical compounds demonstrating reversible changes in physical state experienced during photostimulation with an associated absorption or release of heat. This invention further relates to the use of these compounds as a heat transfer or exchange medium.

2. Related Art

We have been unable to locate prior art pertaining to the use of photochromic compounds as a heat exchange medium. There is, however, a substantial body of prior art regarding the fabrication and use of photochromic compounds in applications such as optical data storage (Eich), optical switches (Kog u re), polarizing eyeglasses (Hares, ophthalmic lenses (Mann, Korn) and optical displays.

All of this prior art utilizes the physical property of photochromism, i.e. photoactivated color changes providing the effect in the desired system; polarized glasses, optical switches and lenses.

Jennings et al, U.S. Pat. No. 5,633,109, teaches the use of photochromic compounds as light sensitive indicators, which he encloses in liposome vesicles for mixture in ink compositions. Once the photochromic compounds are enclosed in the vesicles the ink can be used to print a document which is not visible under normal light. When the document printed using Jennings' ink composition is exposed to U-V light, the photochromic compounds become colored and thus the document becomes partially visible. Jennings does not teach the capture of these configuration changes in a solvent for use as a heat exchange medium.

Sangster et al, U.S. Pat. No. 5,626,020 teaches the use of a photochromic compound in combination with a polymer acting as a heat exchange medium, which will absorb and release heat based on photostimulation and heat gradients. Sangster et al, does not teach the composition of the heat exchange medium.

Luchina, AN 116224482, teaches the use of photochromic compounds in a solvent for use of its color and colorless properties. Luchina also teaches that a photochromic compound, when dissolved in solvents, can be driven to change color by thermal energy. Luchina, however does not teach that the change in color can also bring a change in spatial configuration of the molecule and the associated capture or release of heat.

Japanese patent 3-91,578, teaches the attachment of a spirooxazine compound by covalent linkage to alkyl or akyleneoxide side chains which can be polymerized to a concentration of side chain compounds of preferably more than 30 mol % for use in coatings. The spirooxazine mol % is not specified, however, since the major wt % of the combination should be the acrylic polymer or urethane polymer (at least 50 mol %) then the highest concentration of the spirooxazine compound could be in Japan patent 3-91,578 would be 20 mol %. At this concentration, the photochromic compounds would not experience a change in spatial configuration. Therefore the present invention is not taught by Japanese patent 3-91,578.

Japanese patent 3-81,378 teaches the use of a photochromic compound attached to a polymer and in an organic solvent for use as a colored ink. However the highest concentration of the photochromic compound in this invention is 10 mol %. At this concentration, none of the effects of spatial change in configuration or the capture or release of heat could be experienced, as in the present invention.

Japanese patent 2-164,809 teaches the use of a photochromic compound attached to a film forming polymer in a solvent for use as a colored fingernail polish. Since the combination experiences only normal change in coloration, that is, it becomes colored when exposed to LI-V irradiation, where in the present invention, our combination becomes colorless when exposed to U-V irradiation. This indicates that Japanese patent 2-164,809 could not experience a change in spatial configuration or the capture or release of he and does not teach the present invention.

PRIOR ART REFERENCES

U.S. Pat. No. 5,322,945 June 1994 Buchhultz et al
U.S. Pat. No. 5,225,113 July 1993 Busetto et al
U.S. Pat. No. 5,208,132 May 1993 Karnada et al
U.S. Pat. No. 5,166,345 November 1992 Akashi et al
U.S. Pat. No. 5,155,607 October 1992 Akasaki et al
U.S. Pat. No. 5,017,698 May 1991 Machida et al
U.S. Pat. No. 5,017,225 May 1992 Iwasaki et al
U.S. Pat. No. 5,000,878 March 1991 Chu
U.S. Pat. No. 4,980,089 December 1990 Heller
U.S. Pat. No. 4,962,013 October 1990 Ito et al
U.S. Pat. No. 4,959,471 September 1990 Melzig et al
U.S. Pat. No. 4,929,693 May 1990 Akashi et al
U.S. Pat. No. 4,851,530 July 1989 Rickwood
U.S. Pat. No. 4,851,471 July 1989 Maltiman
U.S. Pat. No. 4,756,973 July 1988 Arakawa et al
U.S. Pat. No. 4,720,356 January 1988 Chu
U.S. Pat. No. 4,699,473 October 1987 Chu
U.S. Pat. No. 4,405,733 September 1983 Meredith
U.S. Pat. No. 3,918,972 November 1975 Evens et al
U.S. Pat. No. 5,024,784 June 1991 Eich et al
U.S. Pat. No. 5,023,859 June 1991 Eich et al
U.S. Pat. No. 4,920,759 May 1990 Ohashi et al
U.S. Pat. No. 4,549,894 October 1985 Araujo
U.S. Pat. No. 4,479,819 October 1984 Borelli
U.S. Pat. No. 4,405,733 September 1983 Meredith
U.S. Pat. No. 4,026,869 May 1977 Evens et al
U.S. Pat. No. 4,857,908 August 1989 Kogure et al
U.S. Pat. No. 4,358,542 November 1982 Hares
U.S. Pat. No. 3,966,311 June 1976 Korn
JP 3-91,578 May 1991 Toray JP 3-81,378 May 1991 Toray
JP 2-164,809 June 1990 Toray

BRIEF SUMMARY OF THE INVENTION

Several objects and advantages of our invention are;

The ability to activate a change in molecular configuration of the photochromic molecule by exposure to light of various wavelengths and;

The creation of a heat exchange medium by placing the photochromic molecule in a solvent;

As the configuration of the photochromic molecule changes the medium transfers the heat captured or released to an enclosing heat exchanger.

Further, the invention teaches the attachment of photochromic compounds which can also be driven to a change in molecular configuration by the addition of heat. Thereafter an exposure to light releases the heat captured.

The invention teaches the attachment of photochromic compounds as a side chain to a larger organic polymer. The addition of a number of photochromic side chains, produces a larger organic polymer which can be induced to change its molecular configuration when the photochromic compound is exposed to light. Thereby releasing a greater quantity of heat.

In the preferred embodiment, a photochromic compound is attached as a side chain to a biopolymer. At a relative concentration of at least 40%, the photochromic compound, when stimulated by light changes its configuration, inducing the biopolymer to change its configuration. This coupled effect, when performed in a solvent, allows the capture or release and transfer of a substantial level of heat.

In another embodiment, the photochromic compound alone when placed in a solvent is stimulated to change configuration by light of differing wavelength. The heat capacity absorbed and released is smaller than the side chain coupled embodiment. However, this embodiment would be more suitable for sequential staged reduction in temperature creating a lesser heat capture in each stage.

BRIEF DESCRIPTION OF THE SEVERAL VIEWS OF THE DRAWING(S)

The preferred embodiment of the invention is, as shown in

FIG. 1; The attachment of a photochromic compound as a side chain to a larger organic polymer contained in a solvent, with the photochromic compound being in a concentration of at least 40 mol %. The photochromic compound could be one of a group which exhibit a CIS-TRANS isomerization such as, for example, the aromatic azo compounds, azobenzene or stilbene or any of these compounds with different substituents such as chlorine, or one of a group which exhibit an open-closed type of isomerization such as, for example, 6 Nitro BIPS (6 Nitro 1,3,3 trimethylspiro[2H-1 benzopyran-2-2 indoline]) or any compound of those types but with different substituents such as a methyl group.

The larger organic polymer could be one of a class of biopolymers as, for example, polymerized glutamic acid (PGA) or a similar type of organic polymer. The solvent could be a mixture of water and other solvent as, for example, ethanol, toluene, or methanol in concentrations from 10% to 100% or combinations of solvents such as, for example, 50% methanol, 10% trifluoracetic acid, and water.

When the medium is exposed to dark and heat the photochromic compound will change its molecular configuration and at the same time the organic polymer will change from helix to random coil. These changes absorb heat through the solvent and heat exchanger. These changes can also be stimulated by exposing the photochromic compound to a specific wavelength of light, as shown in FIG. 1.

When the photochromic compound is exposed to a specific wavelength of light, it will change its molecular configuration from open to closed. At the same time, the organic polymer will change from random coil to helix. These changes release heat to the solvent and the heat exchanger. In other embodiments, changes in molecular configuration can be controlled entirely by differing wavelengths of light.

REFERENCE NUMERALS FOR DRAWING

1 Organic Polymer
2 Photochromic compound in open form
3 Photochromic compound in closed form
4 Light irradiation/Visible wavelength
5 Light Irradiation/Ultraviolet wavelength

DETAILED DESCRIPTION OF THE INVENTION

Figure 1:
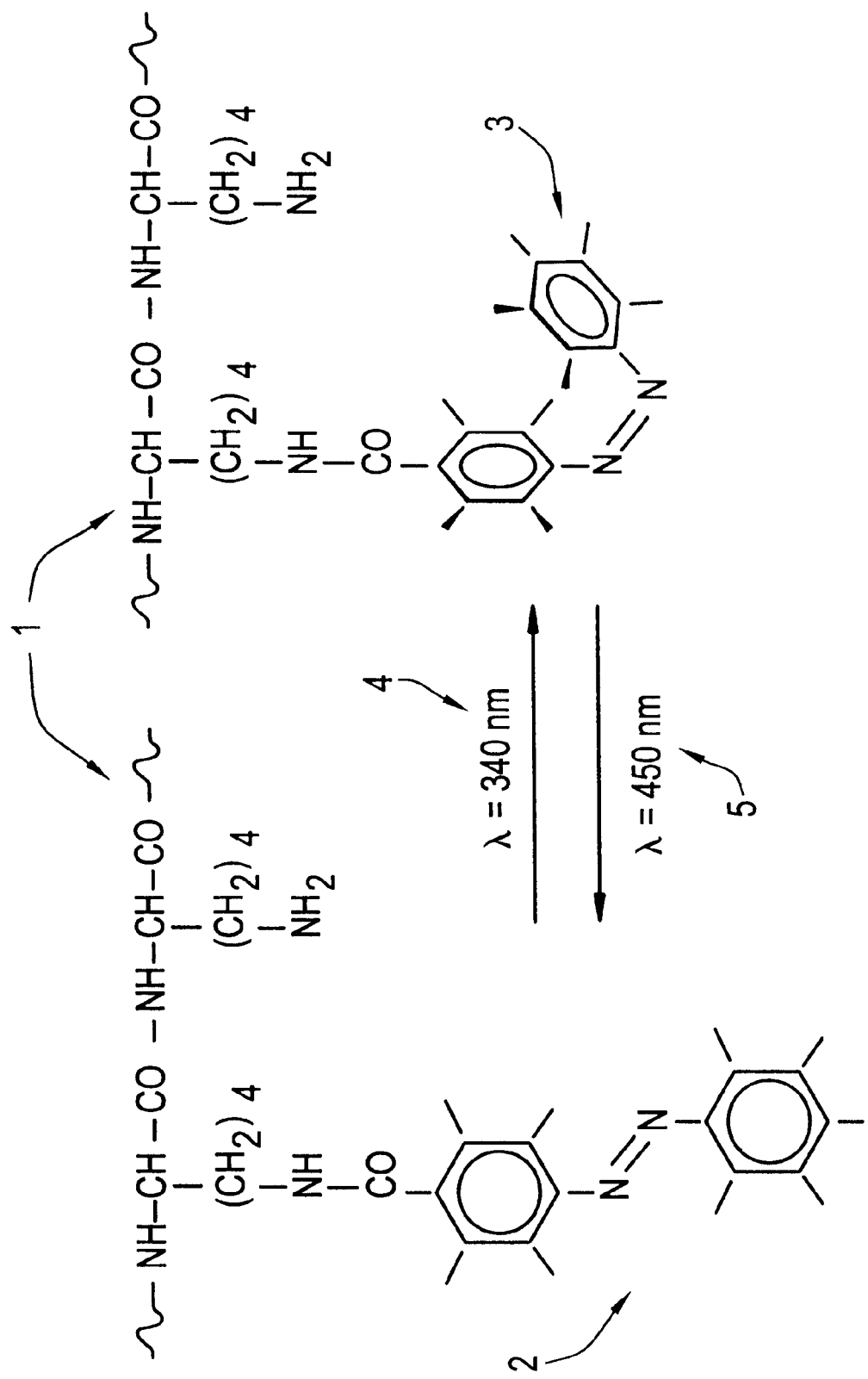

A photochromic molecule is attached as a side chain to a biopolymer backbone in a concentration of at least 40 mol %. Each of these molecules have the capability of assuming different structural configurations. The photochromic molecule can be in an open or closed configuration. The backbone can be in a helix or random coil configuration.

Stimulating the photochromic molecule with irradiation of visible broadband light, will change its molecular structure from open to closed form. The structure of the backbone molecule is coupled to the photochromic molecule change.

Functionally, the medium changes its molecular structure when stimulated by visible light [releases heat] or when exposed to heat [absorbs heat]. Molecular changes in the photochromic molecule interact with solution molecules to absorb or release heat.

Accordingly, it can be seen that this invention describes a heat exchange medium which is controlled by light and which can be structured to provide varying levels of heat absorption by the modification of molecular compositions.

Although the description above contains many specificities, these should not be construed as limiting the scope of the invention but as merely providing illustrations of some of the presently preferred embodiments of this invention. Various other embodiments and ramifications are possible within it's scope. For example, in one of the embodiments the light energy required for activation can be provided by solar light.

Thus the scope of the invention should be determined by the appended claims and their legal equivalents, rather than by the examples given.

What is claimed is:

1. A heat transfer medium changing its molecular configuration when stimulated by heat or light to capture or release heat, comprising;

a photochromic molecule stimulated by heat or light to change configuration, an organic polymer molecule and, a solvent means, wherein the photochromic molecule is present in an amount of at least 4 mol % based on the combination of the photochromic molecule and the organic polymer molecule, and further wherein said photochromic molecule is chemically bonded to said organic polymer molecule.

2. A heat transfer medium, consisting of the photochromic molecule, in a concentration of at least a 40 mol %, in a solvent means.

* * * * *